US009090231B2

(12) United States Patent
Park et al.

(10) Patent No.: US 9,090,231 B2
(45) Date of Patent: Jul. 28, 2015

(54) WIPER BLADE APPARATUS INCLUDING FOOL-PROOF ASSEMBLY STRUCTURE

(71) Applicant: Dongyang Mechatronics Corp., Incheon (KR)

(72) Inventors: Wi Yeong Park, Incheon (KR); Jong Wook Lee, Incheon (KR); Kun Woo Choung, Incheon (KR)

(73) Assignee: Dongyang Mechatronics Corp., Incheon (KR)

( * ) Notice: Subject to any disclaimer, the term of this patent is extended or adjusted under 35 U.S.C. 154(b) by 10 days.

(21) Appl. No.: 14/060,917

(22) Filed: Oct. 23, 2013

(65) Prior Publication Data

US 2014/0201938 A1    Jul. 24, 2014

(30) Foreign Application Priority Data

Jan. 24, 2013 (KR) .......................... 10-2013-0008204

(51) Int. Cl.
*B60S 1/40* (2006.01)
*B60S 1/38* (2006.01)

(52) U.S. Cl.
CPC ................ *B60S 1/38* (2013.01); *B60S 1/3801* (2013.01); *B60S 1/4016* (2013.01); *B60S 2001/409* (2013.01); *B60S 2001/4022* (2013.01); *B60S 2001/4096* (2013.01)

(58) Field of Classification Search
CPC ................ B60S 1/3429; B60S 1/4064; B60S 2001/4093; B60S 2001/4096; B60S 2001/409; B60S 1/38; B60S 1/3801; B60S 2001/4022
USPC .............................. 15/250.32, 250.43, 250.44
See application file for complete search history.

(56) References Cited

U.S. PATENT DOCUMENTS 8,627,540 B2 *    1/2014   Lee et al. ................... 15/250.32

FOREIGN PATENT DOCUMENTS

| DE | 102008040076 A1 * | 1/2010 |
|---|---|---|
| GB | 2 321 844 A | 8/1998 |
| JP | 60-105552 U | 7/1985 |
| JP | 2005-75050 A | 3/2005 |
| KR | 10-0586056 B | 6/2006 |
| KR | 10-2010-0023583 A | 3/2010 |
| KR | 10-2010-0049230 A | 5/2010 |

(Continued)

OTHER PUBLICATIONS

Office action issued by German Patent Office for corresponding German application 10 2013 224 215.8 mailed Mar. 18, 2014 with English translation.
Search Report issued by German Patent Office for corresponding German application 10 2013 224 215.8 mailed Mar. 18, 2014 with English translation.

(Continued)

*Primary Examiner* — Gary Graham
(74) *Attorney, Agent, or Firm* — Frommer Lawrence & Haug LLP; Ronald R. Santucci

(57) ABSTRACT

A wiper blade apparatus, having a main lever which is formed of synthetic resin, includes a rotation shaft that is disposed at a center of the main lever, and formed to connect both sidewalls of the main lever; and a connector that is rotatably coupled to a rotation shaft, and formed to be detachable from the rotation shaft, wherein a first fool-proof assembly unit is formed at the rotation shaft, and restricts a range of a rotation angle of the connector that prevents misassembly of the connector; and a second fool-proof assembly unit is formed on the coupling unit of the connector and, in correspondence with the first fool-proof assembly unit, restricts a range of a rotation angle of the connector.

3 Claims, 7 Drawing Sheets

(56) References Cited

FOREIGN PATENT DOCUMENTS

| | | |
|---|---|---|
| KR | 10-1147826 B | 5/2012 |
| KR | 10-1166524 B | 7/2012 |

OTHER PUBLICATIONS

Notice of Allowance from Korean Patent Office for priority Korean application KR 10-2013-0008204 dated Feb. 22, 2013 with English translation.

* cited by examiner

WIPER BLADE APPARATUS INCLUDING FOOL-PROOF ASSEMBLY STRUCTURE

RELATED APPLICATIONS

This application claims the benefit of Korean Patent Application No. 10-2013-0008204, filed on Jan. 24, 2013, in the Korean Intellectual Property Office, the disclosure of which is incorporated herein in its entirety by reference.

BACKGROUND

1. Field

One or more embodiments of the present invention relate to a wiper blade apparatus.

2. Description of the Related Art

A wiper apparatus for a vehicle is a safety device for maintaining a clear view for a vehicle driver when a driver's view becomes unclear due to snowflakes or rain drops under bad weather conditions, or dust or stains on the windshield, by wiping them off using a wiper blade. The wiper apparatus is mounted on the windshield, a rear window, a side-view mirror, or a head lamp.

Korean Patent Publication No. 2010-0023583 discloses an example of such a wiper apparatus. The wiper apparatus includes a motor, a frame, a linkage, a wiper arm, and a wiper blade.

Generally, the wiper arm and the wiper blade are detachably coupled to each other because the wiper blade is a consumable article, and thus, needs to be exchanged. Additionally, the wiper blade is coupled to the wiper arm so that the wiper blade may rotate within a range of a certain angle. A structure for coupling a wiper arm to a wiper blade is generally referred to as a "connector apparatus". A connector apparatus is rotatably assembled to the wiper blade. The wiper arm is fixed to the connector apparatus, so that the wiper blade may remove foreign substances on the windshield. A U-hook type wiper arm is generally used as a wiper arm that is coupled to the connector apparatus. Korean Patent Publication No. 2010-0049230 discloses an example of a structure, in which a U-hook type wiper arm and a wiper blade are coupled to each other. Generally, there are different types of wiper arms having different thicknesses of a wiper arm or curvatures of a U-hook portion for different types of vehicles. Accordingly, a connector apparatus, having a specification that is appropriate for a respective wiper arm, is assembled to a main lever that forms a wiper blade apparatus. The connector apparatus is detachably assembled with a rotation shaft that is provided with the main lever.

The rotation shaft is generally formed in a stick-shaped structure in which a circular cross-section extends in a direction of a width of the main lever. Accordingly, various types of connector apparatuses may be assembled to the rotation shaft. However, if various types of connector apparatuses are used together in an assembly line, since assembly structures of the rotation shaft and the connector apparatus are identical to each other, misassembly may frequently occur.

The present invention solves such a problem. The present invention provides a wiper blade apparatus in which misassembly is prevented, by improving an assembly structure of a main lever and a connector apparatus which form a wiper blade apparatus.

SUMMARY

Additional aspects will be set forth in part in the description which follows and, in part, will be apparent from the description, or may be learned by practice of the presented embodiments.

According to one or more embodiments of the present invention, a wiper blade apparatus having a main lever which is formed of synthetic resin, includes a rotation shaft that is disposed at a center of the main lever, and formed to connect both sidewalls of the main lever; and a connector that is rotatably coupled to a rotation shaft, and formed to be detachable from the rotation shaft, wherein a first fool-proof assembly unit is formed at the rotation shaft, and restricts a range of a rotation angle of the connector that prevents misassembly of the connector; and a second fool-proof assembly unit is formed on the coupling unit of the connector and, in correspondence with the first fool-proof assembly unit, restricts a range of a rotation angle of the connector.

The first fool-proof assembly unit may be formed to protrude from an outer circumferential surface of the rotation shaft, and extends for a certain angle along a circumferential direction of a shaft, and the second fool-proof assembly unit may be an accommodation groove that accommodates the protruding guide and is formed concave in an inner circumferential surface of the coupling unit, so that the protruding guide may rotate within a certain angle range when the protruding guide is accommodated in the accommodation groove.

The rotation shaft may include an auxiliary groove that is included in a location which does not overlap with the protruding guide, and may be formed concave in the outer circumferential surface of the rotation shaft, and the connector may include an auxiliary protruding unit that is formed to protrude from an inner circumference surface of the coupling unit so that the connector is accommodated in the auxiliary groove.

The protruding guide and the auxiliary groove may be disposed in the same line along a circumference of the rotation shaft.

The first fool-proof assembly unit may be formed concave in an outer circumferential surface of the rotation shaft, and the second fool-proof assembly unit may be accommodated in the first fool-proof assembly unit, and formed to protrude from an inner surface of the coupling unit so that the second fool-proof assembly unit may rotate within a certain angle range when accommodated in the first fool-proof assembly unit

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
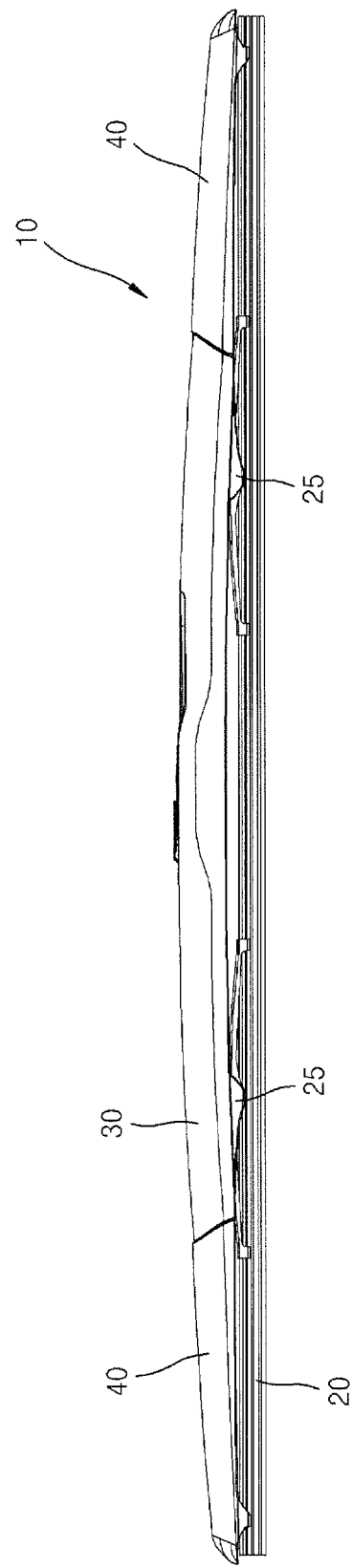
FIG. 1 is a diagram illustrating a wiper blade apparatus according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
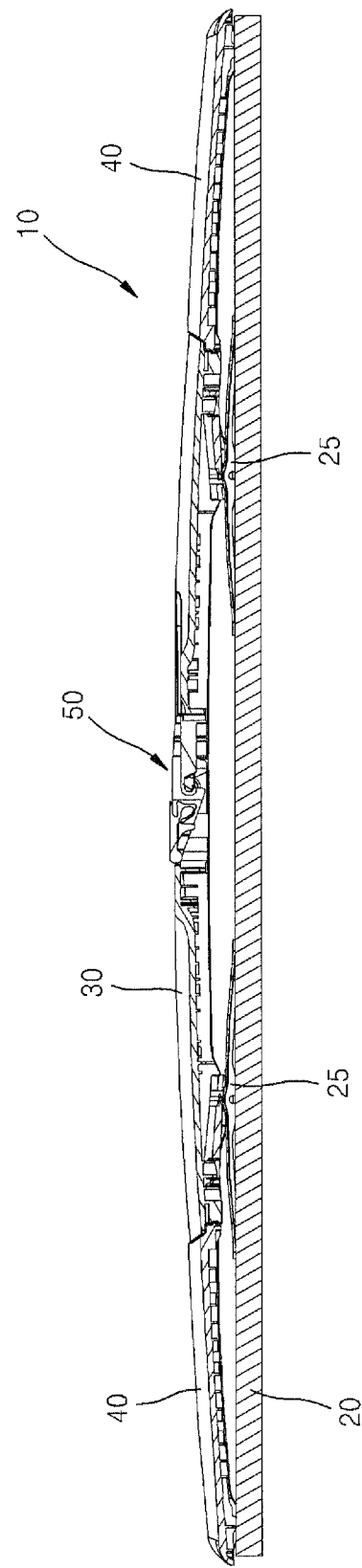
FIG. 2 is a cross-sectional view of the wiper blade apparatus of FIG. 1.
Figure 3:
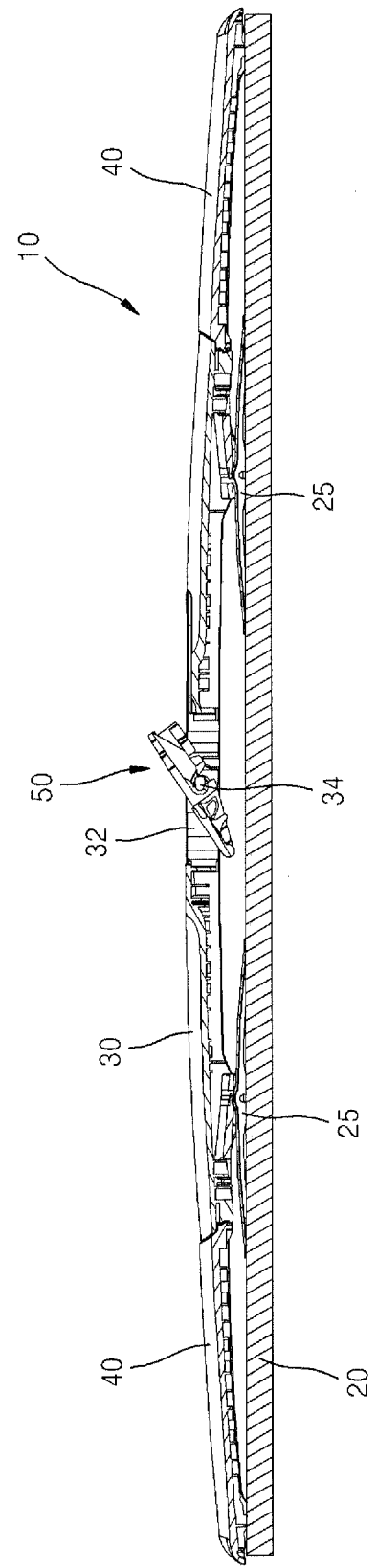
FIG. 3 is a diagram illustrating a state in which a connector, shown in FIG. 2, rotates around a rotation shaft at a certain angle.
Figure 4:
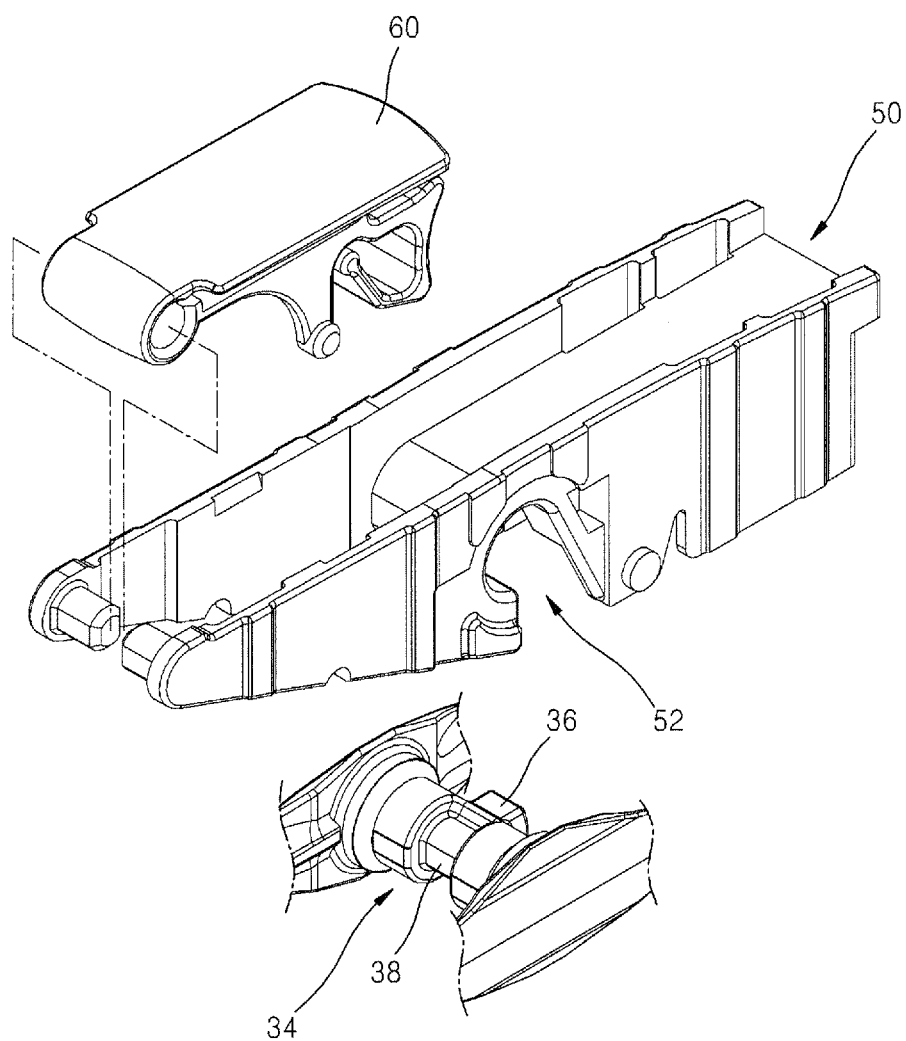
FIG. 4 is an exploded perspective view of main components included in the wiper blade apparatus of FIG. 1.
Figure 5:
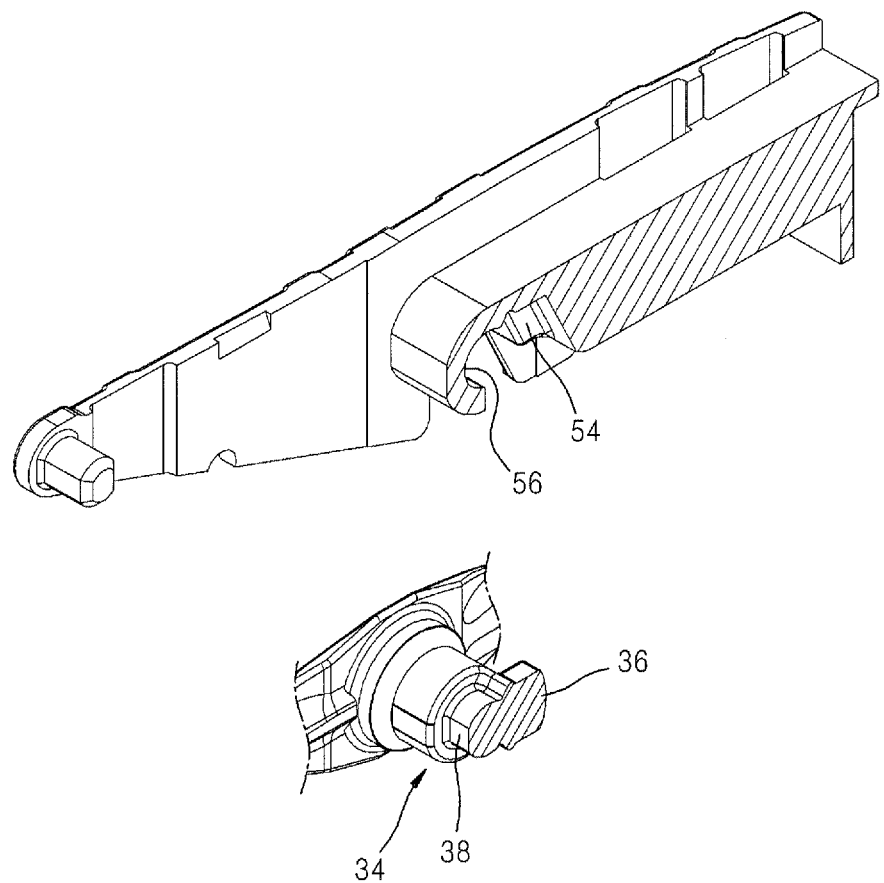
FIG. 5 is a diagram illustrating a structure of coupling a rotation shaft and a connector included in the wiper blade apparatus of FIG. 1.
Figure 6:
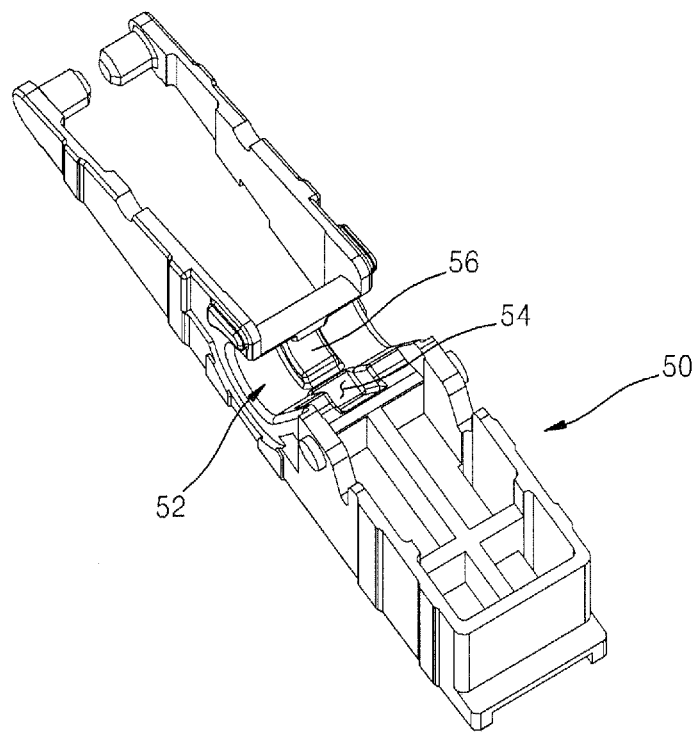
FIG. 6 is a diagram illustrating a structure of coupling a coupling unit included in the connector of FIG. 1.
Figure 7:
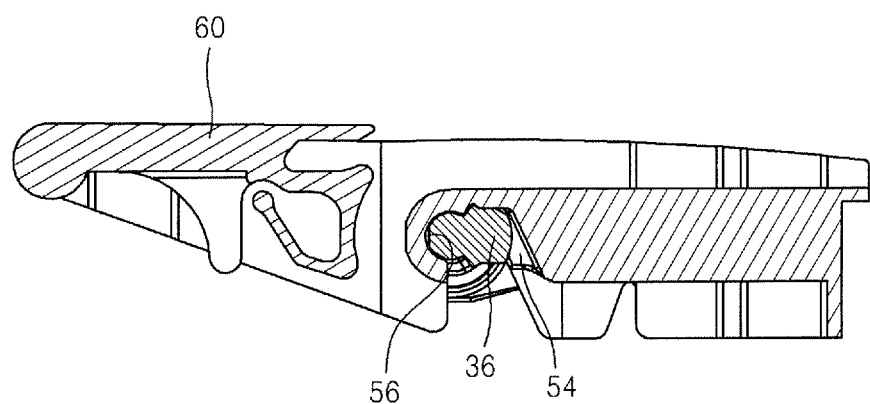
FIGS. 7 and 8 are cross-sectional view of a structure of coupling the rotation shaft and the connector included in the wiper blade apparatus of FIG. 1.
Figure 8:
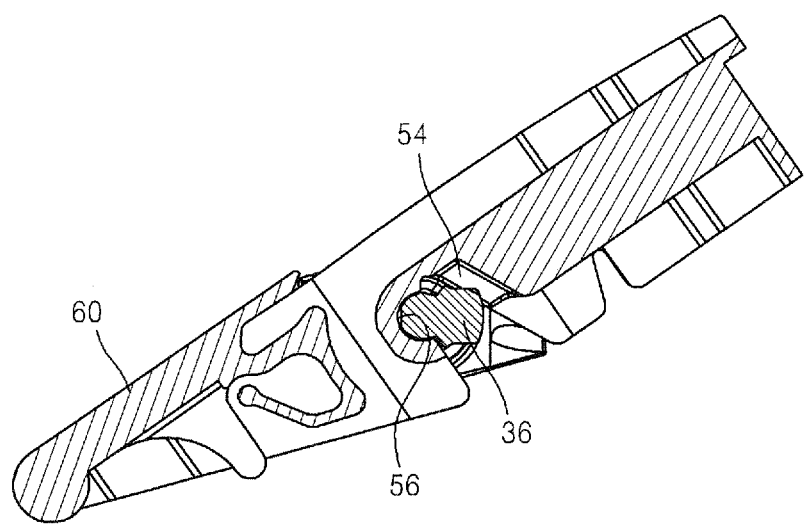

FIG. 1 is a diagram illustrating a wiper blade apparatus 10 according to an embodiment of the present invention. FIG. 2 is a cross-sectional view of the wiper blade apparatus 10 of FIG. 1. FIG. 3 is a diagram illustrating a state in which a connector 50, shown in FIG. 2, rotates around a rotation shaft 34 at a certain angle. FIG. 4 is an exploded perspective view of main components included in the wiper blade apparatus 10 of FIG. 1. FIG. 5 is a diagram illustrating a structure of coupling the rotation shaft 34 and the connector 50 included in the wiper blade apparatus 10 of FIG. 1. FIG. 6 is a diagram illustrating a structure of coupling a coupling unit 52 included in the connector 50 of FIG. 1. FIGS. 7 and 8 are cross-sectional views of a structure of coupling the rotation shaft 34 and the connector 50 included in the wiper blade apparatus 10 of FIG. 1.

Referring to FIGS. 1 through 8, according to an embodiment of the present invention, the wiper blade apparatus 10 that includes a fool-proof assembly structure 10, hereinafter referred to as a "wiper blade apparatus", includes a wiper strip 20, a yoke member 25, an auxiliary lever 40, a main lever 30, and the connector 50.

The wiper strip 20 is a component that is disposed to slide on and contact the windshield of a vehicle so as to remove foreign substances on the windshield. The wiper strip 20 is generally formed of rubber. The wiper strip 20 is coupled to a vertebra (not illustrated) and has an elastic recovering force. The wiper strip 20 is substantially identical to a conventional wiper strip. Thus, a detailed description thereof is not provided here.

A plurality of yoke members 25 are provided. In the current embodiment, two yoke members 25 are included. The yoke members 25 are structures for connecting the wiper strip 20 to the auxiliary lever 40, as described later, via the vertebra.

The auxiliary lever 40 is rotatably coupled to the yoke member 25. An end of the auxiliary lever 40 supports an end of the wiper strip 20 via the vertebra.

The main lever 30 is rotatably coupled to the yoke member 25. The main lever 30 connects two parts of the auxiliary lever 40, separated at both sides of the wiper blade apparatus, to each other. The main lever 30 is a member to which a wiper arm is coupled. The main lever 30 is formed of synthetic resin. The main lever 30 includes an assembly hole 32 at a center so as to be coupled to the wiper arm. The rotation shaft 34 is formed in the assembly hole 32. The rotation shaft 34 is formed to connect both walls of the assembly hole 32 to each other. That is, the rotation shaft 34 is disposed at a center of the main lever 30, and formed to connect both sidewalls of the main lever 30 to each other. The rotation shaft 34 is manufactured as one body with the main lever 30. A first fool-proof assembly unit is formed at the rotation shaft 34. The first fool-proof assembly unit is provided so as to prevent misassembly of the connector 50 that will be described later. The first fool-proof assembly unit functions to restrict a range of a rotation angle of the connector 50. In the current embodiment, the first fool-proof assembly unit is implemented as a protruding guide 36 shown in FIG. 4. The protruding guide 36 is formed to protrude from an outer circumferential surface of the rotation shaft 34. The protruding guide 36 extends at a certain angle along a circumferential direction of a shaft. According to an angle for which the protruding guide is extended, a rotation angle of the wiper blade apparatus 10 around the wiper arm may be adjusted.

The rotation shaft 34 includes an auxiliary groove 38. The auxiliary groove 38 is included in a location which does not overlap with the protruding guide 36. The auxiliary groove 38 is formed concave in the outer circumferential surface of the rotation shaft 34. The auxiliary groove 38 extends for a certain length in a circumferential direction of the rotation shaft 34. The protruding guide 36 and the auxiliary groove 38 are disposed in the same line along a circumference of the rotation shaft 50. The auxiliary groove 38 is a structure that performs an auxiliary function for preventing misassembly of the rotation shaft 34.

The connector 50 is rotatably coupled to the rotation shaft 34. The connector 40 is a member that is accommodated in the assembly hole 32. The connector 50 includes a body to which the wiper arm is connected. A cover 60 that covers a space of the assembly hole 32 may be coupled to a front of the connector 50. The connector 50 includes the coupling unit 52 that is formed to be detachable from the rotation shaft 34. The coupling unit 52 is a groove that is opened in one direction, and is formed in the connector 50 in a direction of a width of the connector 50. A second fool-proof assembly unit is formed in the coupling unit 52. In correspondence with the first fool-proof assembly unit, the second fool-proof assembly unit restricts a range of a rotation angle of the connector 50. In the current embodiment, the second fool-proof assembly unit is implemented as an accommodation groove 54 that is shown in FIGS. 5 and 6. The accommodation groove 54 is formed to accommodate the protruding guide 36. The accommodation groove 54 is formed concave in an inner circumferential surface of the coupling unit 52, so that the protruding guide 36 may rotate within a certain angle range when the protruding guide 36 is accommodated in the accommodation groove 54. When the protruding guide 36 rotates at a certain angle when accommodated in the accommodation groove 54, and then, contacts a wall that is formed at an end of the accommodation groove 43, the protruding guide 54 can no longer rotate. The protruding guide 36 and the accommodation groove 54 are formed so that only connectors with a structure which may be coupled to each other, among various types of connectors 50, are assembled to the protruding guide 36 and the accommodation groove 54. Thus, misassembly thereof may be prevented.

The connector 50 includes an auxiliary protruding unit 56. The auxiliary protruding unit 56 is formed to protrude from an inner circumference surface of the coupling unit 52 so as to be accommodated in the auxiliary groove 38. The auxiliary protruding unit 56 and the accommodation groove 54 are disposed in the same line along a circumference of the rotation shaft 34.

Unlike the description provided above, an embossed structure of the first fool-proof assembly unit and the second fool-proof assembly unit may be formed in an opposite form. That is, the first fool-proof assembly unit may be formed to be concave in an outer circumferential surface of the rotation shaft. In this case, desirably, the second fool-proof assembly unit may be accommodated in the first fool-proof assembly unit, and formed to protrude from an inner surface of the coupling unit 52, so that the second fool-proof assembly unit may rotate within a range of a certain angle when accommodated in the first fool-proof assembly unit. Such a structure, in another embodiment of the present invention, may be easily modified from the structure that is provided with regard to FIGS. 1 through 9. Thus, a detailed description thereof is not provided here.

Hereinafter, a working effect of the present invention will be described in detail. With regard to the wiper blade apparatus 10 in the current embodiment, as described above, a process of coupling the connector 50 to the rotation shaft 34, which is provided on the main lever 30, is described as an example.

Referring to FIG. 4, even though the rotation shaft 34 is formed as one body with the main lever 30, for convenience of illustration, only the rotation shaft 34, other than the main lever 30, is shown in an extracted form in FIG. 4. The coupling unit 52, included in the connector 50, is accessed to the rotation shaft 34. If the accommodation groove 54, included in the connector 50, and the protruding guide 36, included at the rotation shaft 54, have a structure that may be coupled to each other, the connector 50 and the rotation shaft 34 may be assembled to each other. If the rotation shaft 34 includes the protruding guide 36 and the connector 50 does not include the accommodation groove 54, the connector 50 cannot be assembled to the rotation shaft 34. Additionally, the auxiliary groove 38 and the auxiliary protruding unit 56 are disposed in the same line in a circumferential direction of the rotation shaft 34 and coupled to each other. Thus, a fool-proof assembly function may be implemented well. Referring to FIGS. 7 and 8, a structure, in which the connector 50 rotates when the auxiliary protruding unit and the auxiliary groove 38 are coupled to each other, may be easily understood. Additionally, referring to FIGS. 7 and 8, it may also be easily understood that, as the protruding guide 36 contacts an end of the accommodation groove 54, a rotation of the connector 50 is restricted.

As described above, according to the one or more of the above embodiments of the present invention, a wiper blade apparatus, which includes a fool-proof assembly structure, includes a protruding guide that prevents misassembly at a rotation shaft that is included in a main lever, and an accommodation groove that corresponds to the protruding guide in a connector. Thus, misassembly of other elements in a process of assembling the main lever with the connector may be prevented. Additionally, an embossed structure of the first fool-proof assembly unit and the second fool-proof assembly unit may be formed in an opposite form. That is, even when the connector includes a protruding unit and the rotation shaft includes a groove, the same effect of the present invention may result.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A wiper blade apparatus having a main lever which is formed of synthetic resin, the wiper blade apparatus comprising:
   a rotation shaft that is disposed at a center of the main lever, and formed to connect both sidewalls of the main lever; and
   a connector that is rotatably coupled to the rotation shaft, and formed to be detachable from the rotation shaft,
   wherein a first fool-proof assembly unit is formed at the rotation shaft, and restricts a range of a rotation angle of the connector that prevents misassembly of the connector; and
   a second fool-proof assembly unit is formed on a coupling unit of the connector and, in correspondence with the first fool-proof assembly unit, restricts a range of a rotation angle of the connector,
   wherein the first fool-proof assembly unit is formed to protrude from an outer circumferential surface of the rotation shaft, and extends for a certain angle along a circumferential direction of the rotation shaft, and
   the second fool-proof assembly unit is an accommodation groove that accommodates a protruding guide and is formed concave in an inner circumferential surface of the coupling unit, so that the protruding guide may rotate within a certain angle range when the protruding guide is accommodated in the accommodation groove,
   wherein the rotation shaft comprises an auxiliary groove that is comprised in a location which does not overlap with the protruding guide, and is formed concave in the outer circumferential surface of the rotation shaft, and
   the connector comprises an auxiliary protruding unit that is formed to protrude from an inner circumference surface of the coupling unit so that the connector is accommodated in the auxiliary groove.

2. The wiper blade apparatus of claim 1, wherein the protruding guide and the auxiliary groove are disposed in a same line along a circumference of the rotation shaft.

3. The wiper blade apparatus of claim 1, wherein the first fool-proof assembly unit is formed concave in an outer circumferential surface of the rotation shaft, and
   the second fool-proof assembly unit is accommodated in the first fool-proof assembly unit, and formed to protrude from an inner surface of the coupling unit so that the second fool-proof assembly unit may rotate within a certain angle range when accommodated in the first fool-proof assembly unit.

* * * * *